(12) United States Patent
Nachenberg

(10) Patent No.: US 8,561,180 B1
(45) Date of Patent: Oct. 15, 2013

(54) SYSTEMS AND METHODS FOR AIDING IN THE ELIMINATION OF FALSE-POSITIVE MALWARE DETECTIONS WITHIN ENTERPRISES

(75) Inventor: Carey S. Nachenberg, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 596 days.

(21) Appl. No.: 12/260,913

(22) Filed: Oct. 29, 2008

(51) Int. Cl.
*G06F 11/00* (2006.01)

(52) U.S. Cl.
USPC .............................................. 726/22; 726/24

(58) Field of Classification Search
USPC ....................... 707/102; 726/22, 24
See application file for complete search history.

(56) References Cited

U.S. PATENT DOCUMENTS

| | | | | |
|---|---|---|---|---|
| 6,754,230 | B2* | 6/2004 | Purpura et al. | 370/468 |
| 7,096,498 | B2* | 8/2006 | Judge | 726/22 |
| 7,181,768 | B1* | 2/2007 | Ghosh et al. | 726/23 |
| 2005/0120019 | A1* | 6/2005 | Rigoutsos et al. | 707/6 |
| 2006/0184488 | A1* | 8/2006 | Wentland | 706/45 |
| 2007/0106424 | A1* | 5/2007 | Yoo et al. | 700/245 |
| 2008/0216174 | A1* | 9/2008 | Vogel et al. | 726/22 |
| 2008/0249793 | A1* | 10/2008 | Angell et al. | 705/1 |
| 2009/0293126 | A1* | 11/2009 | Archer et al. | 726/24 |
| 2009/0307329 | A1* | 12/2009 | Olston et al. | 709/214 |

OTHER PUBLICATIONS

Oberheide et al., CloudAV: N-Version Antivirus in the Network Cloud, Jul. 2008, USENIX Association, SS'08 Proceedings of the 17th conference on Security symposium, pp. 91-106.*

* cited by examiner

*Primary Examiner* — Peter Shaw
*Assistant Examiner* — Dao Ho
(74) *Attorney, Agent, or Firm* — ALG Intellectual Property, LLC

(57) ABSTRACT

Methods and systems for aiding in the detection of false positives generated by security systems are disclosed. One exemplary server-side method may comprise: 1) building a database containing a copy of, and metadata for, each file within an enterprise that is capable of posing a security risk, 2) identifying a determination by a security system that at least one of the files within the enterprise poses a security risk, and then 3) assisting a user to evaluate whether the security system has generated any false positives by presenting to the user both a list of each file within the enterprise that the security system determined poses a security risk and metadata for each file on the list. Corresponding client-side methods and systems are also disclosed.

16 Claims, 7 Drawing Sheets

SYSTEMS AND METHODS FOR AIDING IN THE ELIMINATION OF FALSE-POSITIVE MALWARE DETECTIONS WITHIN ENTERPRISES

BACKGROUND

Every time a security vendor creates or updates virus definitions, fingerprint databases, or malware-detection heuristics, there is the chance that such definitions, databases, and heuristics may result in mistakenly identifying a legitimate file as malicious. Such mistakes, often referred to as "false positives," may be extremely disruptive and costly for enterprises since they can result in the deletion or removal of legitimate, and potentially essential, files and software from computing devices within the enterprise. As such, the instant disclosure identifies a need for systems and methods for aiding in the elimination of false-positive malware detections within enterprises.

SUMMARY

As will be described in greater detail below, the instant disclosure generally relates to systems and methods for aiding in the elimination of false-positive malware detections within enterprises. In one example, a method for aiding in the detection of false positives generated by security systems may comprise: 1) building and maintaining a central database that contains both: a) a copy of each file within an enterprise that is capable of posing a security risk (such as executables) and b) metadata for each file that is relevant to evaluating whether the file poses a security risk, 2) applying a vendor-supplied virus definition set and/or malware-detection heuristic to each file in the central database, and then 3) presenting to an administrator of the enterprise both: a) a list of each file within the enterprise that was identified by the vendor-supplied security operation as posing a security risk and b) the metadata for each file on the list. In one example, this information may be presented to the administrator prior to deploying the vendor-supplied virus definition set and/or malware-detection heuristic within the enterprise.

As will be described in greater detail below, the information that is presented to the administrator may help the administrator rapidly determine whether the vendor-supplied security operation generated any false positives (i.e., mistakenly identified any legitimate files as malicious) prior to deploying the vendor-supplied virus definition set and/or malware-detection heuristic within the enterprise. Examples of information that may be presented to an administrator include, without limitation, the name of a file, usage data that identifies the prevalence of a file within an enterprise (e.g., "the file 'pdf-maker.exe' is used by 1,295 users within the enterprise"), vendor-supplied reputation data for a file, a pathname for a file, an installation date/time for a file, a source of origin for a file (such as information that identifies the vendor or supplier of a file, the website from which the file was obtained or originated, or the like), the date and/or time when a file was created or last modified, a hash or checksum of a file, or any other potentially relevant information.

In certain embodiments, the system may present both the list of each file within the enterprise that was identified by the vendor-supplied security operation as posing a security risk and the metadata for each file in a graphical user interface. After reviewing the information displayed in the user interface, the administrator may identify false positives generated by the vendor-supplied security operation by interacting with the user interface. The system may then: 1) report any administrator-identified false positives to a security vendor and/or 2) add any such false positives to an enterprise-wide whitelist that may be subsequently deployed, along with vendor-supplied virus definitions and/or malware-detection heuristics, within the enterprise.

In one example, the system may build and maintain the central database by causing each client within the enterprise to: 1) identify each file on the client that is capable of posing a security risk and then 2) transmit a copy of each unique (and as-of-yet un-submitted) file to the central database.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
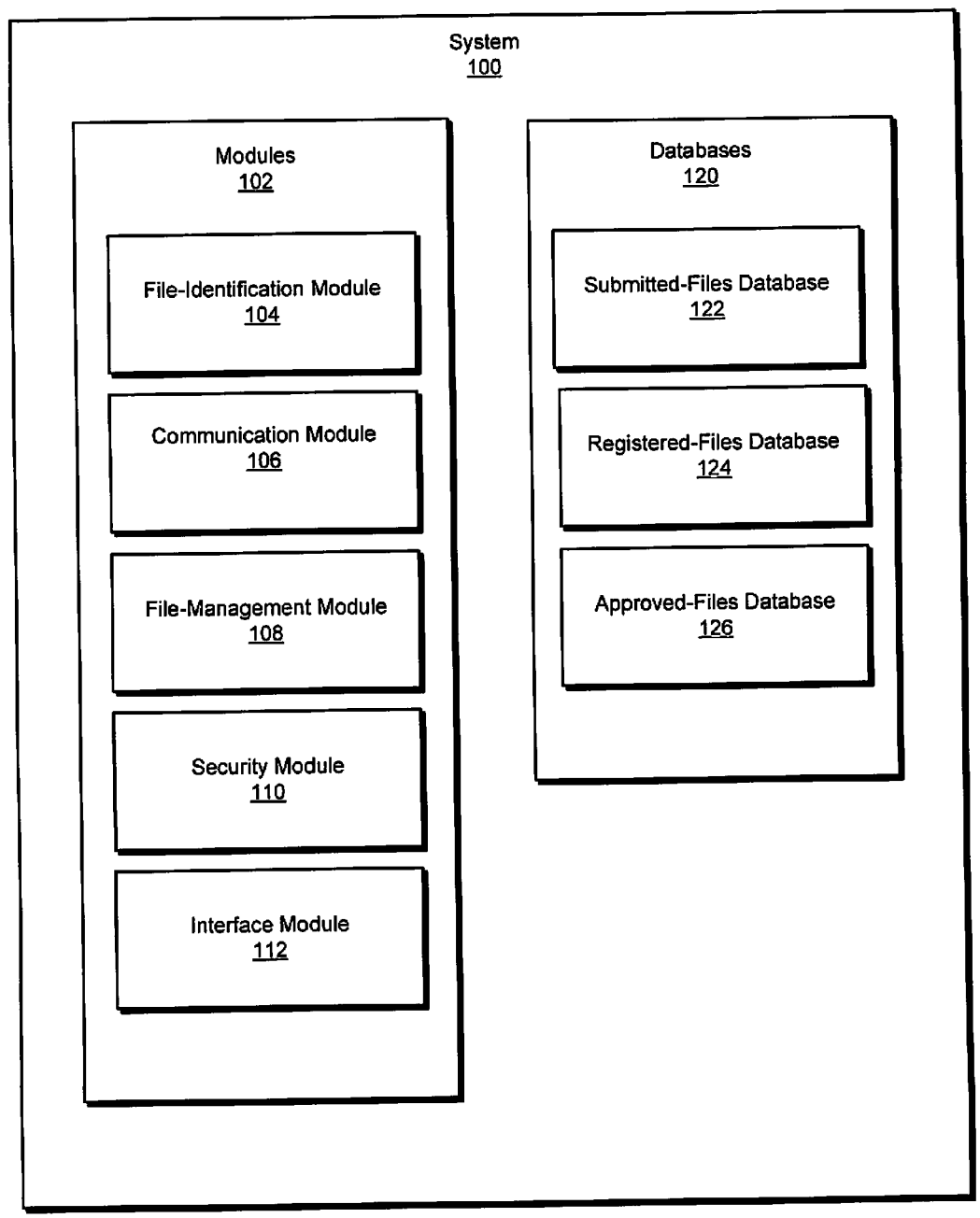
FIG. 1 is a block diagram of an exemplary system for aiding in the elimination of false-positive malware detections within enterprises according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure generally relates to systems and methods for aiding in the elimination of false-positive malware detections within enterprises. The phrase "false positive" generally refers to an occasion where a security system (such as an antivirus software solution) mistakenly identifies a legitimate file as malicious. In addition, the phrase "enterprise," as used herein, may refer to any system comprising at least one centralized computing system and at least one client-side computing device in communication with the centralized computing system.

Figure 2:
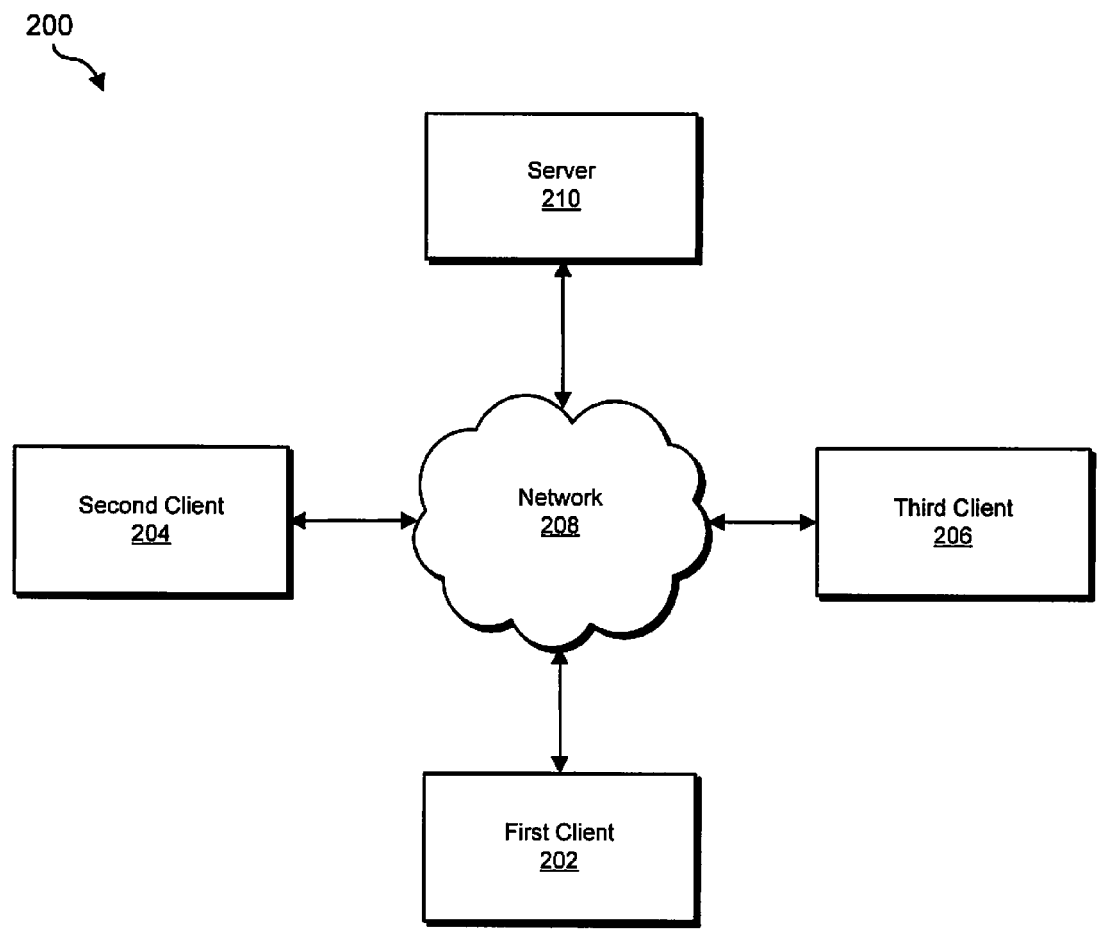
FIG. 2 is a block diagram of an exemplary system for aiding in the elimination of false-positive malware detections within enterprises according to an additional embodiment.

The following will provide, with reference to FIGS. 1-2, detailed descriptions of exemplary systems for aiding in the elimination of false-positive malware detections within enterprises. Detailed descriptions of corresponding exemplary computer-implemented methods will also be provided in connection with FIGS. 3-5. In addition, descriptions of an exemplary computing system and network architecture capable of implementing one or more of the embodiments described and/or illustrated herein will also be provided in connection with FIGS. 6 and 7.

FIG. 1 is a block diagram of an exemplary system 100 for aiding in the elimination of false-positive malware detections within enterprises. As illustrated in this figure, exemplary system 100 may comprise one or more modules 102 for performing one or more tasks. For example, exemplary system 100 may comprise a file-identification module 104 for identifying files (such as executable files) on computing devices within an enterprise that are capable of posing a security risk. Examples of files that are capable of posing a security risk include, without limitation, executables, libraries, or any other file that is capable of executing or containing malicious payload.

Exemplary system may also comprise a communication module 106 for facilitating the transfer of information about such files between client-side computing devices and a centralized computing system. In addition, exemplary system 100 may comprise a file-management module 108 for building a central database (such as registered-files database 124 in FIG. 1) that contains a copy of, and metadata for, each file within the enterprise that is capable of posing a security risk. Exemplary system 100 may also comprise a security module 110 for applying virus definitions and/or malware-detection heuristics supplied by security vendors to files within the enterprise. Exemplary system 100 may additionally comprise an interface module 112 for presenting information to a user that may help the user evaluate whether the vendor-supplied virus definitions and/or malware-detection heuristics generated any false positives. Although not illustrated in FIG. 1, exemplary system 100 may also comprise one or more additional modules.

In certain embodiments, one or more of modules 102 in FIG. 1 may represent one or more software applications or programs that, when executed by a computing device, may cause the computing device to aid in eliminating false-positive malware detections within enterprises. For example, as will be described in greater detail below, one or more of modules 102 may represent software modules configured to run on one or more computing devices, such as the devices of enterprise 200 in FIG. 2 (e.g., clients 202, 204, and 206 and server 210), computing system 610 in FIG. 6, and/or portions of exemplary network architecture 700 in FIG. 7. One or more modules 102 in FIG. 1 may also represent all or portions of one or more special-purpose computers configured to perform one or more tasks.

As illustrated in FIG. 1, exemplary system 100 may also comprise one or more databases 120. Databases 120 may represent portions of a single database or computing device or a plurality of databases or computing devices. In one embodiment, exemplary system 100 may comprise a submitted-files database 122 for storing information about files that have been submitted by client-side computing devices (such as clients 202, 204, and 206 in FIG. 2) to a centralized computing system (such as server 210) within an enterprise. Exemplary system 100 may also comprise a registered-files database 124 that may contain a copy of, and metadata for, each file within the enterprise that is capable of posing a security risk. In addition, exemplary system 100 may comprise an approved-files database 126 for storing files (or digital signatures of files) that have been identified as legitimate by an administrator of an enterprise. In some examples, approved-files database 126 may represent, or may be used to generate, a whitelist.

One or more of databases 120 in FIG. 1 may represent a portion of one or more computing devices. For example, one or more of databases 120 may represent a portion of one or more of the devices in FIG. 2, computing system 610 in FIG. 6, and/or portions of exemplary network architecture 700 in FIG. 7. Alternatively, one or more of databases 120 in FIG. 1 may represent one or more physically separate devices capable of being accessed by a computing device, such as the devices in FIG. 2, computing system 610 in FIG. 6, and/or portions of exemplary network architecture 700 in FIG. 7.

Exemplary system 100 in FIG. 1 may be deployed in a variety of ways. In one example, system 100 may be deployed within an enterprise. FIG. 2 is a block diagram of an exemplary enterprise 200 in which system 100 in FIG. 1 may be deployed. Exemplary enterprise 200 generally represents any type, form, or size of network, organization, or system comprising at least one centralized computing system (e.g., a server) and at least one client-side computing device in communication with the centralized computing system. In the example illustrated in FIG. 2, exemplary enterprise 200 may comprise a first client 202, a second client 204, and a third client 206 in communication with a server 210 via a network 208. In at least one embodiment, and as will be described in greater detail below, server 210 may receive (via network 208) a copy of, and/or metadata associated with, each file on clients 202, 204, and 206 that is capable of posing a security risk.

First, second, and third clients 202, 204, and 206 generally represent any type or form of client-side computing device. Examples of clients 202, 204, and 206 include, without limitation, laptops, desktops, cellular phones, personal digital assistants (PDAs), multimedia players, embedded systems, servers, combinations of one or more of the same, or any other suitable computing device. Similarly, server 210 generally represents any type or form of centralized or server-side computing device.

Network 208 generally represents any medium capable of facilitating communication or data transfer. Examples of network 208 include, without limitation, an intranet, a wide area network (WAN), a local area network (LAN), a personal area network (PAN), the Internet, power line communications (PLC), a cellular network (e.g., GSM network), or the like. Network 208 may facilitate communication or data transfer using wireless or wired connections.

As mentioned above, one or more of modules 102 in FIG. 2 may be stored and configured to run on server 210 and/or clients 202, 204, and 206 in FIG. 2. Furthermore, one or more of modules 102 may be shared between server 210 and/or clients 202, 204, and 206, meaning that the same module may be configured to operate simultaneously on separate devices for a single purpose. In both cases, and as will be described in greater detail below, modules 102 may enable server 210 and/or clients 202, 204, and 206 to aid administrators in eliminating false-positive malware detections within enterprises.

Figure 3:
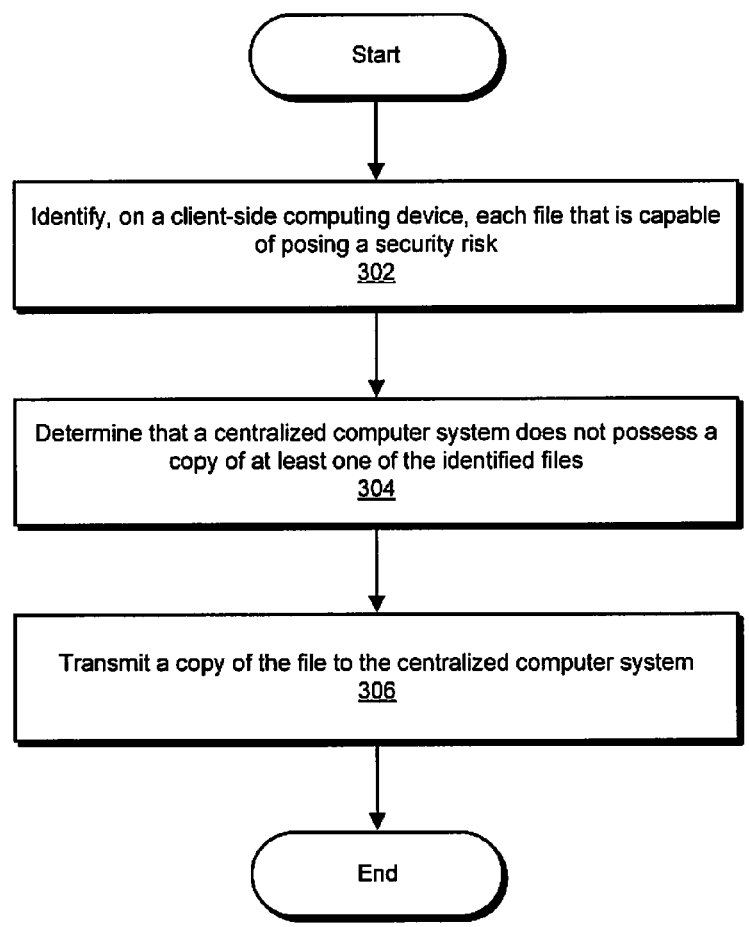
FIG. 3 is a flow diagram of an exemplary computer-implemented method for aiding in the identification of false positives generated by security systems according to at least one embodiment.

FIG. 3 is a flow diagram of an exemplary method 300 for aiding in the identification and elimination of false-positive malware detections within enterprises. This method may be implemented, in whole or in part, by a client-side computing device within an enterprise. As illustrated in FIG. 3, at step 302 the system may identify each file on a client-side computing device that is capable of posing a security risk. For example, file-identification module 104 in FIG. 1 (which, as detailed above, may be stored and configured to run on a client-side computing device, such as first client 202 in FIG. 2) may identify all executable files stored on first client 202.

At step 304, the system may determine that a centralized computing system does not possess a copy of at least one of the files identified in step 302. For example, file-identification module 104 in FIG. 1 may determine that server 210 in FIG. 2 does not possess a copy of at least one of the executable files stored on first client 202.

The system may perform step 304 in a variety of ways. In one example, the system may determine that the centralized computer system does not possess a copy of at least one of the files identified in step 302 by: 1) transmitting a unique identifier for each of the files identified in step 302 to the centralized computer system and then 2) receiving a request from the centralized computer system for a full copy of at least one of these files. The phrase "unique identifier," as used herein, generally refers to any type or form of identifier that may be used to identify a file. Examples of unique identifiers include, without limitation, hashes, checksums, or any other form of information that may be used to identify a file.

For example, file-identification module 104 in FIG. 1 may, via communication module 106 and network 208, transmit a MD5 hash for each executable file stored on first client 202 in FIG. 2 to server 210. If communication module 106 (which, as detailed above, may be stored and configured to run on first client 202) subsequently receives a request from server 210 for a full copy of one or more of these executable files, then file-identification module 104 may conclude that server 210 does not possess a copy of the requested executable files.

At step 306, the system may transmit, to the centralized computing system, a full copy of each file on the client-side computing device that the system has determined is not currently stored on the centralized computing system. For example, file-management module 104 may, via communication module 106, transmit to server 210 a copy of each executable file stored on first client 202 that is requested by server 210. In some examples, communication module 106 may transmit copies of files in a throttled manner to prevent heavy network usage. Upon completion of step 306, exemplary method 300 may terminate.

In some examples, upon transmitting a full copy of a file to the centralized computer system, the system may store a unique identifier for the file in a local database to prevent duplicate submissions. For example, file-identification module 104 in FIG. 1 may, after causing communication module 106 to transmit a full copy of a file to server 210 via network 208 in FIG. 2, store a hash or checksum for the file in submitted-files database 124 in FIG. 1 (which may, as detailed above, represent a portion of first client 202). When file-identification module 104 subsequently identifies a file downloaded, stored, or otherwise loaded onto first client 202, file-identification module 104 may avoid sending duplicative information to server 210 by, prior to sending a unique identifier for the file to server 210, scanning submitted-files database 124 to determine whether file-identification module 104 has previously submitted information regarding the file to server 210.

Although not illustrated in FIG. 3, in certain embodiments exemplary method 300 may also comprise: 1) identifying characteristics, for each file on the client-side computing device that is capable of posing a security risk, that are relevant to evaluating whether the file poses a security risk, 2) generating metadata for the file that identifies one or more of these characteristics, and then 3) transmitting the metadata to the centralized computer system. Examples of characteristics that may be used as the basis for generating metadata include, without limitation, a file's installation path, the date and time when a file was installed, a source of origin for a file (such as information that identifies the vendor or supplier of a file, the website from which the file was obtained or originated, or the like), a hash or checksum for a file, or any other potentially relevant information.

Figure 4:
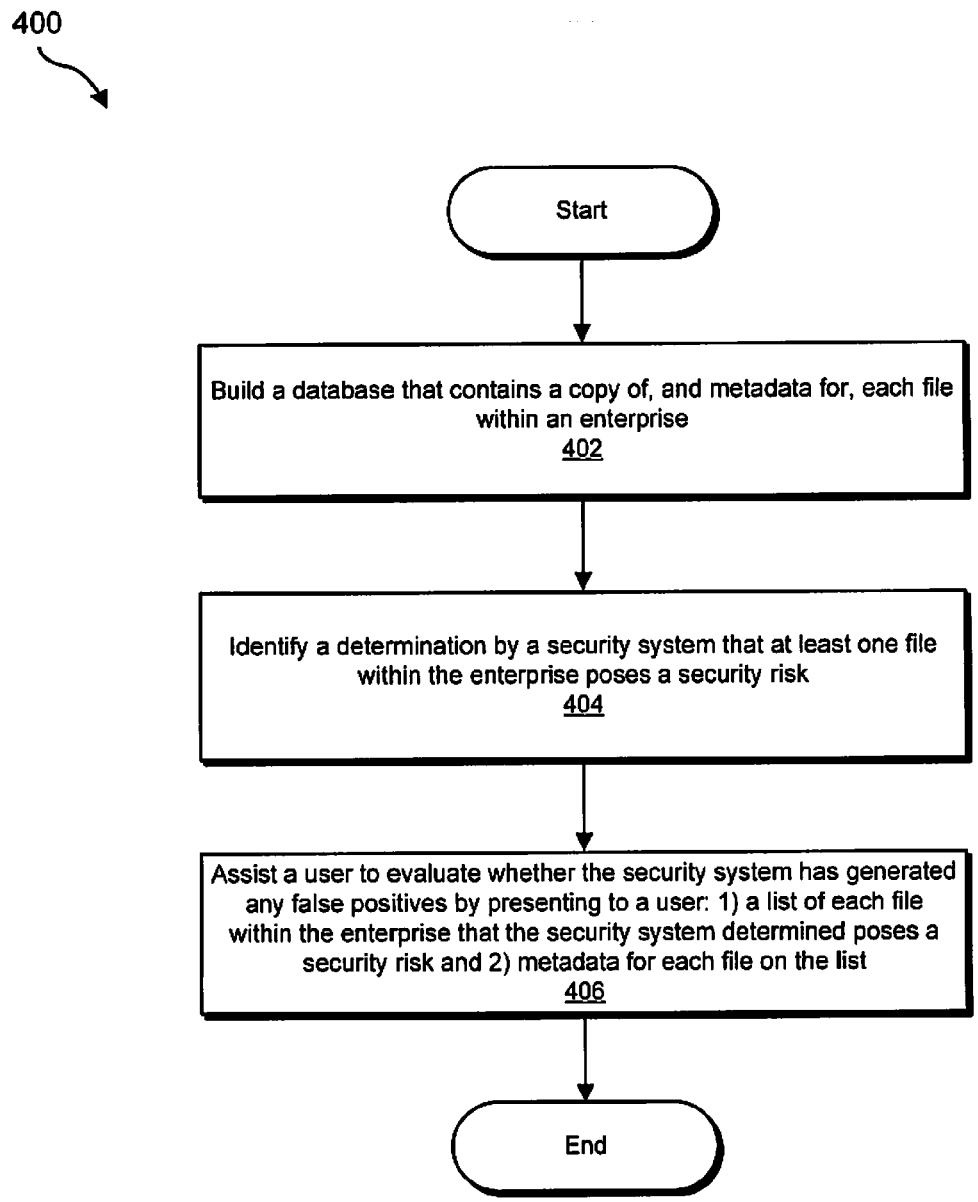
FIG. 4 is a flow diagram of an exemplary computer-implemented method for aiding in the identification of false positives generated by security systems according to an additional embodiment.

FIG. 4 is a flow diagram of an exemplary method 400 for aiding in the identification and elimination of false-positive malware detections within enterprises. This method may be implemented, in whole or in part, by a centralized computing device (such as server 210 in FIG. 2) within an enterprise. As illustrated in FIG. 4, at step 402 the system may build a database that contains: 1) a copy of each file within an enterprise that is capable of posing a security risk and 2) metadata for each of these files. For example, file-management module 108 in FIG. 1 (which may, as detailed above, be stored and configured to run on server 210 in FIG. 2) store a copy of, and metadata for, each unique executable within enterprise 200 in registered-files database 124.

The system may build such a database in a variety of ways. In one example, the system may: 1) receive, from at least one client within the enterprise, a unique identifier for at least one file on the client that is capable of posing a security risk, 2) determine, based on the unique identifier, that the database does not contain a copy of the file, 3) request a copy of the file from the client, 4) receive the copy of the file from the client, and then 5) store the copy of the file in the database. For example, file-management module 108 in FIG. 1 (which may, as detailed above, be stored and configured to run on server 210 in FIG. 2) may receive, via communication module 106, a hash for the executable file "foo.exe" from first client 202. If file-management module 108 determines that a full copy of the file "foo.exe" is not contained within registered-files database 124, then file-management module 108 may transmit, via communication module 106, a request to first client 202 for a full copy of the file. Upon receiving a full copy of the file "foo.exe" from first client 202, file-management module 108 may store the full copy in registered-files database 124.

In certain embodiments, the system may also store, along with the copy of the file, metadata for the file in registered-files database 124. The term "metadata," as used herein, may refer to information about a file that may be relevant to evaluating whether the file poses a security risk. Examples of metadata include, without limitation, usage data that identifies the prevalence of a file within an enterprise (e.g., "the file 'pdfmaker.exe' is used by 1,295 users within the enterprise"), vendor-supplied reputation data for a file, a pathname for a file, an installation date/time for a file, a source of origin for a file (such as information that identifies the vendor or supplier of a file, the website from which the file was obtained or originated, or the like), a hash or checksum of a file, or any other potentially relevant information. Metadata may be received from clients within an enterprise, from third-party sources (such as reputation-data servers), created by the centralized computing system, or combinations of the same.

Prior to deploying new virus definitions and/or malware detection heuristics enterprise-wide, administrators may wish to apply such definitions and heuristics to files in their database to determine the likelihood of any false positives. Returning to FIG. 4, at step 404 the system may scan (using a vendor-supplied virus definition set and/or malware detection heuristic) each file in the central database to determine whether the vendor-supplied security operation identifies at least one of the files within the enterprise as posing a security risk. Step 404 may be performed in a variety of ways. In one example, security module 110 in FIG. 1 may: 1) determine that a portion of at least one file within registered-files database 124 matches at least one digital signature within a virus definition set or fingerprint database supplied by a security vendor and/or 2) identify at least one file within registered-files database 124 that satisfies a malware-detection heuristic supplied by a security vendor.

At step 406, the system may assist a user in evaluating whether the security determination identified in step 404 resulted in any false positives. In one example, the system may assist the user in such an evaluation by presenting to the user both: 1) a list of each file within the enterprise that was identified by the security system as posing a security risk and 2) metadata, for each file on the list, that is relevant to evaluating whether the file actually poses a security risk. Upon completion of step 406, exemplary method 406 may terminate.

Figure 5:
FIG. 5 is a block diagram of an exemplary user interface for presenting information that may be used to identify false positives generated by security systems.

The system may perform step 406 in a variety of ways. In one example, interface module 112 in FIG. 1 (which may, as detailed above, be stored and configured to run on server 210 in FIG. 2) may generate a graphical user interface capable of displaying both the list and the metadata for each file on the list. FIG. 5 is a block diagram of an exemplary user interface 500 for presenting information that may assist a user or administrator in identifying false positives generated by a security system. Exemplary user interface 500 generally represents any type or form of user interface. Examples of user interface 500 include, without limitation, a client-based GUI, a server-side console, a web browser configured to transmit and receive data from a web server, or any other form of user interface.

User interface 500 may display information in a variety of ways. For example, user interface 500 may display text-based information, graphics-based information, and/or a combination of the same. In the example illustrated in FIG. 5, exemplary user interface 500 may display: 1) each file within the enterprise that was identified by the security system as posing a security risk (column 502), 2) a hash or checksum for each file (column 504), 3) a pathname for each file (column 506), 4) an installation date/time for each file (column 508), 5) prevalence information for each file (e.g., the percentage of clients within the enterprise that have the file installed) (column 510), 6) whether vendor-supplied reputation data for each file is available (column 512), and/or source-of-origin information for each file (column 514). In one example, user interface 500 may allow an administrator or user to order or group files by various attributes (such as by pathname, by prevalence information, by publisher, by installation date/time, etc.) in order to facilitate bulk evaluation, rather than one-by-one analysis by the user.

As detailed above, the information displayed in user interface 500 may help a user or administrator determine whether one or more of the files identified by a security operation (such as the security operation identified in step 404) represent false positives. For example, an administrator of an enterprise may determine, by analyzing the information displayed in user interface 500, that the file "pdfreader.exe" is, contrary to the security operation's determination, a legitimate file since: 1) the filepath for this file appears to be legitimate, 2) vendor-supplied reputation data for the file is available, 3) the file originated from a known-legitimate vendor ("PDF Maker, Inc."), and 4) this file is present on 89% of the clients within the enterprise.

After reviewing the information displayed in user interface 500, a user or administrator may identify a file displayed in user interface 500 as a false positive by selecting one of user-selectable objects 516. If user interface 500 receives a user-generated response that identifies at least one false positive, then security module 110 in FIG. 1 may: 1) report the false positive to a security vendor and/or 2) add the false-positive file to an enterprise-wide whitelist (such as approved-files database 126 in FIG. 1) that may be subsequently deployed, along with any vendor-supplied virus definitions and/or malware-detection heuristics, within the enterprise.

As detailed above, the systems and methods described herein may present information to an administrator of an enterprise that may help the administrator identify false positives generated through application of vendor-supplied virus definitions and/or malware-detection heuristics. Moreover, given the prevalence of polymorphic malware, this information may help an administrator to differentiate between low-prevalence malware from high-prevalence legitimate applications. By allowing the administrator to identify false positives prior to deploying such vendor-supplied security operations throughout the enterprise, the systems and methods described herein may prevent extremely disruptive and costly errors that may be caused by deleting or removing legitimate software and files from computing systems within the enterprise.

Figure 6:
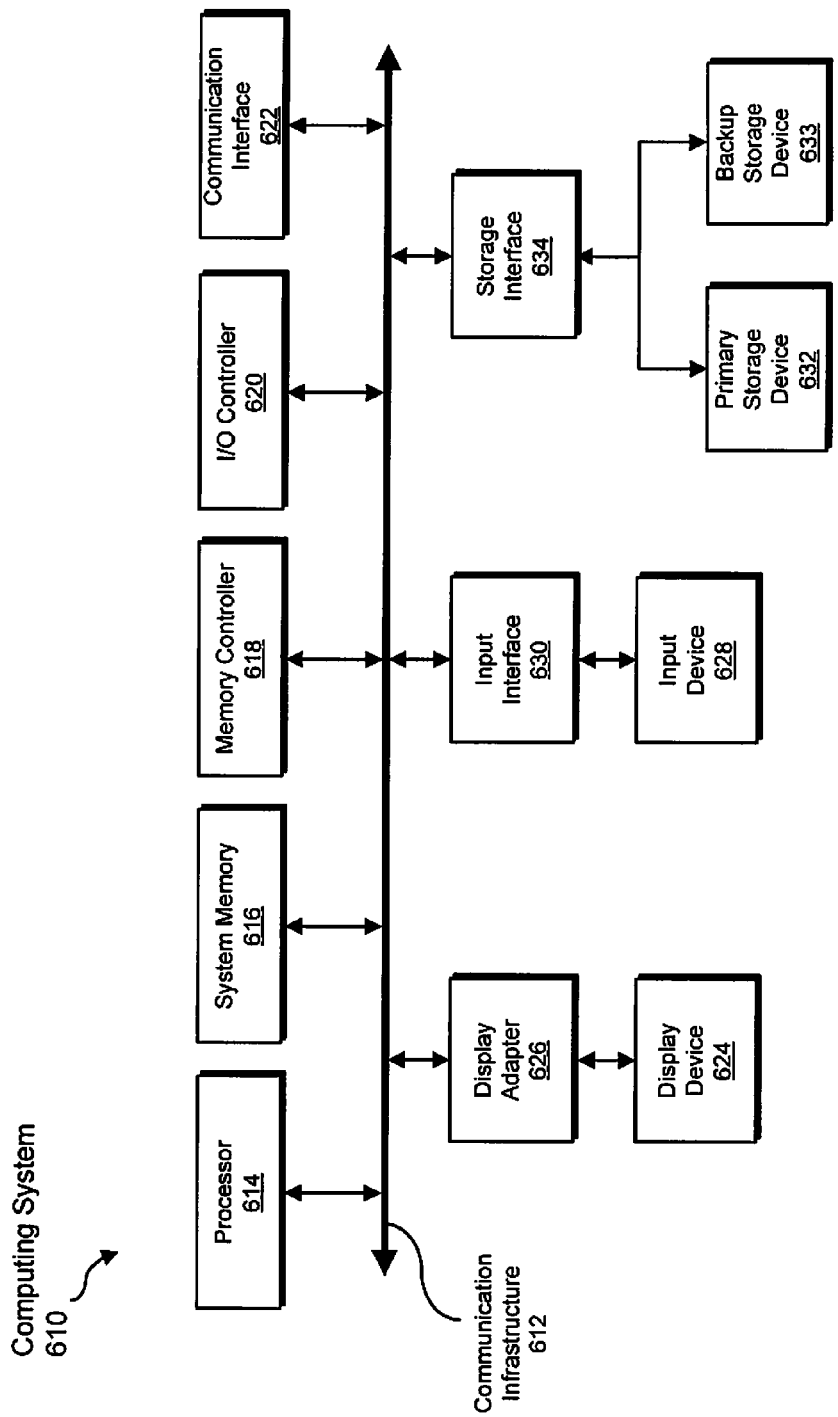
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the building, identifying, assisting, presenting, displaying, receiving, reporting, adding, transmitting, determining, requesting, storing, generating, applying, and throttling steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as building, identifying, assisting, presenting, displaying, receiving, reporting, adding, transmitting, determining, requesting, storing, generating, applying, and throttling.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for building, identifying, assisting, presenting, displaying, receiving, reporting, adding, transmitting, determining, requesting, storing, generating, applying, and throttling steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network or a wireless I EEE 802.11 network), a personal area network (such as a BLUETOOTH network or an IEEE 802.15 network), a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the building, identifying, assisting, presenting, displaying, receiving, reporting, adding, transmitting, determining, requesting, storing, generating, applying, and throttling steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the building, identifying, assisting, presenting, displaying, receiving, reporting, adding, transmitting, determining, requesting, storing, generating, applying, and throttling steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, the exemplary file systems disclosed herein may be stored on primary storage device 632, while the exemplary file-system backups disclosed herein may be stored on backup storage device 633. Storage devices 632 and 633 may also be used, for example, to perform and/or be a means for performing, either alone or in combination with other elements, one or more of the building, identifying, assisting, presenting, displaying, receiving, reporting, adding, transmitting, determining, requesting, storing, generating, applying, and throttling steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 7 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
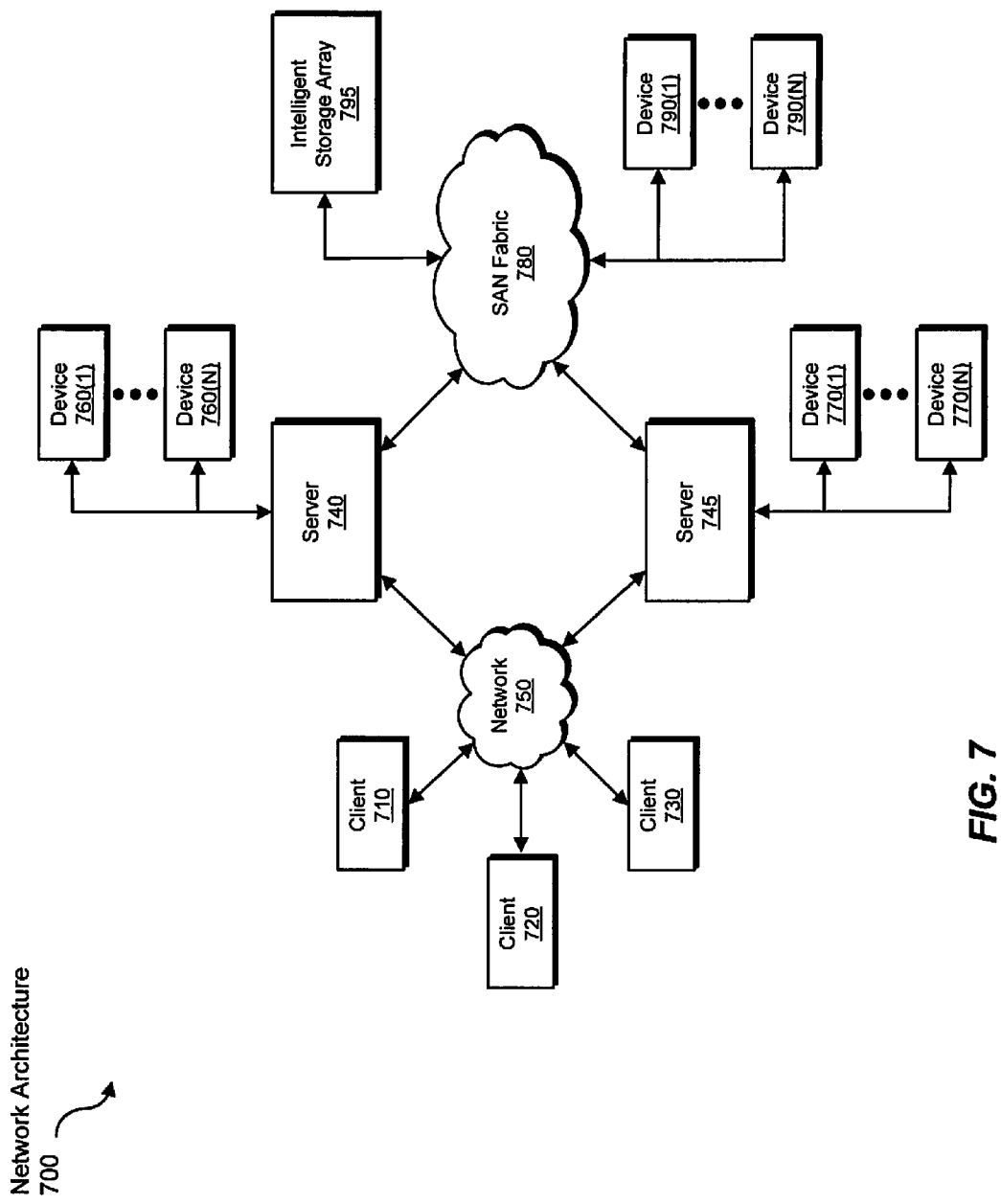
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or to run certain software applications. Network 750 generally represents any telecommunication or computer network; including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the building, identifying, assisting, presenting, displaying, receiving, reporting, adding, transmitting, determining, requesting, storing, generating, applying, and throttling steps disclosed herein. Network architecture 700 may also be used to perform and/or be a means for performing other steps and features set forth in the instant disclosure.

As detailed above, one or more of the systems described herein may perform and/or be a means for performing either alone or in combination with other elements, one or more of the exemplary methods described and/or illustrated herein. For example, the systems described herein may perform a method for aiding in the detection of false positives generated by security systems that may comprise: 1) building a database containing both copies of files within an enterprise that are capable of posing a security risk and metadata that is relevant to evaluating whether any of the files pose a security risk, 2) identifying a determination by a security system that at least one of the files within the enterprise poses a security risk, and then 3) assisting a user to evaluate whether the security system has generated any false positives by presenting to the user both a list of each file within the enterprise that the security system determined poses a security risk and metadata for each file on the list.

In one example, presenting the list and the metadata to the user may comprise displaying the list and the metadata within a graphical user interface. The method may also comprise receiving, via the graphical user interface, a user-generated response that identifies at least one false positive generated by the security system. The method may also comprise reporting the false positive to a security vendor and/or adding the false positive to a whitelist. The method may also comprise transmitting the whitelist to each client within the enterprise.

In one example, building the database may comprise: 1) receiving, from at least one client within the enterprise, a unique identifier for at least one file on the client that is capable of posing a security risk, 2) determining, based on the unique identifier, that the database does not contain a copy of the file, 3) requesting a copy of the file from the client, 4) receiving the copy of the file from the client, and then 5) storing the copy of the file in the database. Building the database may also comprise: 1) receiving at least a portion of metadata for the file from the client, 2) generating or retrieving, from a local or remote service, at least a portion of metadata for the file, and/or 3) storing metadata for the file in the database.

The determination by the security system that at least one of the files within the enterprise poses a security risk may comprise: 1) determining that a portion of at least one file within the database matches at least one signature within a virus definition set supplied by a security vendor and/or 2) determining that at least one file within the database triggers a malware-detection heuristic supplied by the security vendor. The metadata for each file may comprise: 1) usage data that identifies the prevalence of the file within the enterprise, 2) vendor-supplied reputation data for the file, 3) vendor-supplied prevalence data for the file, 4) a pathname for the file, 5) an installation time for the file, 6) a creation date for the file, 7) a last-modified date for the file, 8) a source of origin of the file (such as a publisher or digital signer of the file), and/or 9) a hash of the file.

The systems described herein may also perform and/or be a means for performing either alone or in combination with other elements, a computer-implemented method for aiding in the detection of false positives generated by security systems that comprises: 1) identifying, on a client-side computing device, each file that is capable of posing a security risk, 2) determining that a centralized computer system does not possess a copy of at least one of the identified files, and then 3) transmitting a copy of the file to the centralized computer system.

The method may also comprise, for at least one of the identified files: 1) identifying characteristics of the file that are relevant to evaluating whether the file poses a security risk, 2) generating, based on the characteristics, metadata for the file, and then 3) transmitting the metadata to the centralized computer system. The characteristics of the file may comprise a pathname for the file, an installation time for the file, a source of origin of the file, a last-modified time for the file, and/or a hash of the file.

In some examples, the step of determining that the centralized computer system does not possess a copy of the file may comprise: 1) transmitting a unique identifier for the file to the centralized computer system and 2) receiving a request from the centralized computer system for a copy of the file. The method may also comprise, upon transmitting the copy of the file to the centralized computer system, storing a unique identifier for the file in a submitted-files database.

In addition, the method may comprise, prior to determining that the centralized computer system does not possess a copy of the file, determining that the file is new to the client-side computing device by scanning the submitted-files database. The method may also comprise throttling transmission of the copy of the file to the centralized computer system. In addition, the method may further comprise receiving a whitelist from the centralized computer system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for aiding in the detection of false positives generated by security systems, at least a portion of the method being performed by a centralized computer system comprising at least one processor, the method comprising:
   building a registered-files database for a group of centrally managed computers by:
      receiving, from the group of centrally managed computers, a unique identifier for each file within the group of centrally managed computers that will be scanned by a security component that is to be deployed within the group of centrally managed computers;
      determining, based on the unique identifiers, that the registered-files database does not contain a full copy of at least one file that will be scanned by the security component;
      requesting a full copy of the file from at least one client within the group of centrally managed computers;
      receiving the full copy of the file from the client;
      storing the full copy of the file in the registered-files database such that the registered-files database contains:
         a full copy of each file within the group of centrally managed computers that will be scanned by the security component;
         metadata that is relevant to evaluating whether any of the files that will be scanned comprise malware;
   prior to deploying the security component to the group of centrally managed computers for the first time, determining whether the security component would generate any false positives if deployed within the group of centrally managed computers by incorrectly classifying legitimate files as malicious by:
      applying the security component to the files contained within the registered-files database;
      presenting, to an administrator of the registered-files database, both a list of each file within the registered-files database that the security component classified as malicious and metadata for each file on the list;
      upon presenting the list and the metadata to the administrator, receiving a user-generated response from the administrator that identifies at least one false positive generated by the security component;
   upon determining that the security component would generate the false positive if deployed within the group of centrally managed computers, performing at least one action that aids in the elimination of the false positive.

2. The method of claim 1, wherein presenting the list and the metadata to the administrator comprises displaying the list and the metadata within a graphical user interface.

3. The method of claim 2, wherein receiving the user-generated response comprises receiving the user-generated response via the graphical user interface.

4. The method of claim 1, wherein the action comprises at least one of:
   reporting the false positive to a security vendor;
   adding the false positive to a whitelist that identifies trusted files within the group of centrally managed computers.

5. The method of claim 4, further comprising transmitting the whitelist to each client within the group of centrally managed computers.

6. The method of claim 1, wherein building the registered-files database further comprises at least one of:
   receiving at least a portion of metadata for the file from the client;
   generating at least a portion of metadata for the file;
   storing metadata for the file in the registered-files database.

7. The method of claim 1, wherein the security component comprises at least one of:
   a virus definition set supplied by a security vendor;
   a malware-detection heuristic supplied by a security vendor.

8. The method of claim 1, wherein the metadata for each file on the list comprises at least one of:
   usage data that identifies the prevalence of the file within the group of centrally managed computers;
   vendor-supplied prevalence data for the file;
   vendor-supplied reputation data for the file;
   a pathname for the file;
   an installation time for the file;
   a source of origin of the file;
   a creation date for the file;
   a last-modified date for the file;
   a hash of the file.

9. A computer-implemented method for aiding in the detection of false positives generated by security systems, the method comprising:
   identifying, on a client-side computing device within a group of centrally managed computers, each file on the client-side computing device that will be scanned by a security component that is to be deployed to clients within the group of centrally managed computers;
   for at least one of the identified files:
      determining that a centralized computer system within the group of centrally managed computers does not possess a full copy of the file by:
         transmitting a unique identifier for the file to the centralized computer system;
         receiving a request from the centralized computer system for a full copy of the file;
      transmitting a full copy of the file to the centralized computer system to enable the centralized computer system to build a registered-files database that contains a full copy of each file within the group of centrally managed computers that will be scanned by the security component;
   wherein the centralized computer system determines, prior to deploying the security component to the clients within the group of centrally managed computers for the first time, whether the security component would generate any false positives if deployed within the group of centrally managed computers by incorrectly classifying legitimate files as malicious by:
      applying the security component to the files contained within the registered-files database;
      presenting, to an administrator of the registered-files database, both a list of each file within the registered-files database that the security component classified as malicious and metadata for each file on the list;
   upon presenting the list and the metadata to the administrator, receiving a user-generated response from the administrator that identifies any false positives generated by the security component.

10. The method of claim 9, further comprising, for at least one of the identified files:
   identifying characteristics of the file that are relevant to evaluating whether the file comprises malware;
   generating, based on the characteristics, metadata for the file;

transmitting the metadata to the centralized computer system.

11. The method of claim 10, wherein the characteristics of the file comprise at least one of:
    a pathname for the file;
    an installation time for the file;
    a source of origin of the file;
    a last-modified time for the file;
    a hash of the file.

12. The method of claim 9, further comprising, upon transmitting the full copy of the file to the centralized computer system, storing a unique identifier for the file in a submitted-files database.

13. The method of claim 12, further comprising, prior to determining that the centralized computer system does not possess a full copy of the file, determining that the file is new to the client-side computing device by scanning the submitted-files database.

14. The method of claim 9, further comprising throttling transmission of the full copy of the file to the centralized computer system.

15. The method of claim 9, further comprising receiving a whitelist from the centralized computer system that identifies trusted files within the group of centrally managed computers.

16. A system for aiding in the detection of false positives generated by security systems, the system comprising:
    a file-management module programmed to build a registered-files database for a group of centrally managed computers by:
        receiving, from the group of centrally managed computers, a unique identifier for each file within the group of centrally managed computers that will be scanned by a security component that is to be deployed within the group of centrally managed computers;
        determining, based on the unique identifiers, that the registered-files database does not contain a full copy of at least one file that will be scanned by the security component;
        requesting a full copy of the file from at least one client within the group of centrally managed computers;
        receiving the full copy of the file from the client;
        storing the full copy of the file in the registered-files database such that the registered-files database contains:
            a full copy of each file within the group of centrally managed computers that will be scanned by the security component;
            metadata that is relevant to evaluating whether any of the files that will be scanned comprise malware;
    a security module and an interface module programmed to:
        prior to deploying the security component to the group of centrally managed computers for the first time, determine whether the security component would generate any false positives if deployed within the group of centrally managed computers by incorrectly classifying legitimate files as malicious by:
            applying the security component to the files contained within the registered-files database;
            presenting, to an administrator of the registered-files database, both a list of each file within the registered-files database that the security component classified as malicious and metadata for each file on the list;
            upon presenting the list and the metadata to the administrator, receiving a user-generated response from the administrator that identifies at least one false positive generated by the security component;
        upon determining that the security component would generate the false positive if deployed within the group of centrally managed computers, perform at least one action that aids in the elimination of the false positive;
    at least one processor configured to execute the file-management module, the security module, and the interface module.

* * * * *